UNITED STATES PATENT OFFICE 2,345,945

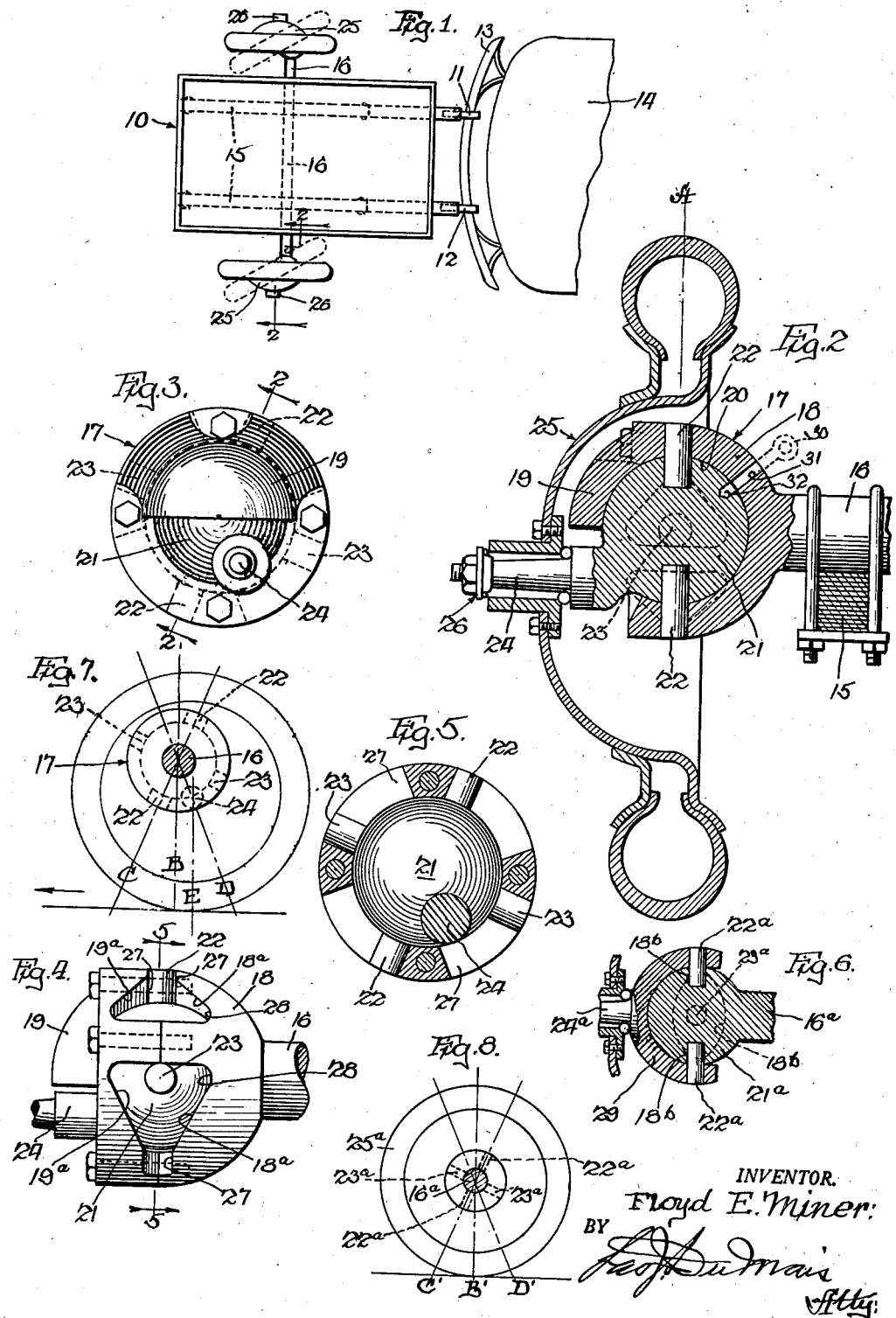

TRAILER WHEEL SUPPORTING MEANS

Floyd E. Miner, Bensenville, Ill.

Application September 10, 1942, Serial No. 457,819

9 Claims. (Cl. 280—33.4)

The present invention relates to a trailer, and is more particularly directed to the wheel-supporting means.

In the use of trailers, it has been found to be almost an impossibility to back them up, as, for instance, when parking in a relatively small space, or in order to align them at the curb with the vehicle which is drawing them.

Further, in the use of a trailer, the trailer wheels are usually pivoted to a solid axle, and during turning movements of the vehicle, the trailer will follow and the strain exerted thereon will tend to cause the trailer wheels to skid somewhat in order to align themselves with the car during these turning movements. For this reason, it has been practically impossible to arrange the trailer in order to properly track while being pulled and also to properly track while reversing the vehicle for backing the same and trailer into a parking space.

By experimenting with and constructing various types of trailer wheel-supporting means, it has been found that when the wheels were given a certain amount of freedom, so as to permit them to independently pivot on a substantially vertical axis to approximately 30 degrees in either direction from their normal axially aligned tracking relation, the trailer will accurately follow the line of traction of the vehicle drawing the same.

And, further, it has been found that the substantially vertical axis of each of the trailer wheels, when inclined or pitched slightly with their lower ends directed in the direction the trailer is being moved, will effect a caster to the wheels and assist in directing the wheels for the proper traction and for easy maneuverability with the vehicle.

It is, therefore, an object of the present invention to accomplish the above-pointed out features in a trailer wheel supporting means whereby the wheels will automatically adjust themselves in accordance with the direction of movement of the trailer.

A further object is the provision of a combination swingable and pivotal means on each end of the axle and to which means the wheels are journaled for controlling the swinging and pivotal adjustments of the said means.

A further object is the provision of stop and guide means for limiting the swinging and pivotal adjustments of the wheels.

And a further object is the provision of centering means for the substantially pitched axis of the wheels whereby said axis may be pitched in either forward or rearward directions and retained at such pitched positions by reason of the turning movement of the wheels.

And a still further object is the provision of axis means arranged in pairs to be selectively brought into operative positions in accordance with the direction of turning movements of the wheels, and the pair of axis means rendered free serving to limit the independent pivotal movements of the wheels.

Other and further objects will become apparent from the ensuing description and claims.

In order to illustrate the operative movements of the device, I have illustrated the drawing in a manner for explanatory purposes only, to point out the theory involved in the operation of the device.

Referring to the drawing:

Figure 1 illustrates a trailer embodying the invention and showing the trailer as attached to the rear bumper of an automobile.

Fig. 2 is an enlarged detail sectional view taken substantially on the lines 2—2 of Figs. 1 and 3.

Fig. 3 is an end elevation of Fig. 2 with the wheel and bearing thereof removed.

Fig. 4 is a partial detail side elevation of Fig. 2.

Fig. 5 is a cross-sectional view taken on the line 5—5 of Fig. 4.

Fig. 6 is a reduced sectional view of a modified construction showing the axle spindle aligned with the main axle.

Fig. 7 is a diagrammatic schematic view illustrating the positions assumed by the pitched axis of the wheels with respect to the main axle in accordance with the direction in which the wheels are being turned; and Fig. 8 is a diagrammatic schematic view illustrating the position assumed by the pitched axis of the wheels when the wheels are journaled in alignment with the axle.

The reference numeral 10 designates a trailer which as shown is attached at 11 and 12 to the bumper 13 of a vehicle 14. While I have illustrated the trailer as being rigidly attached to the bumper, the same may be pivotally attached, if desired.

The trailer construction is illustrated as of the conventional type having a pair of semi-elliptical springs 15 to which is secured the axle 16 which may be of any suitable shape, and is provided at each end thereof with a ball and socket arrangement designated as a whole as 17. This ball and socket arrangement 17 comprises a shell 18 to which is secured a cap 19 providing a socket 20 which retains the ball 21. The shell 18 and cap 19 are relieved at 18a and 19a, respectively, to receive diametrically opposed studs 22—22 and a pair of diametrically opposed studs 23—23 arranged at 90 degrees to the studs 22—22 and which studs are secured into the ball 21 or which may be an integral part thereof. The studs are arranged in pairs and form alternate pivots for the wheels, as will be hereafter explained.

The ball 21 is also provided with an outwardly directed spindle 24, which provides the axle center on which the wheels 25 are journaled, being pivoted thereon by means of a ball-race and securing nut, designated as a whole as 26.

The wheels 25 are illustrated as of the dished disc type, which radially position the center line of the tread A thereof with the studs 22—22 and 23—23 and, due to this structure, the tread center line is maintained in alignment with these studs during all movements of the wheels.

When a forward pull is exerted on the trailer 10, the frictional resistance of the wheels 25, as clearly illustrated in Fig. 7, will tend to turn the ball 21 therewith and effect a forward movement of the studs 22—22 from a position of the vertical line B to an inclined forward position illustrated by dot and dash line C. During this movement of the ball 21, the studs 22—22 will move therewith from the enlarged recesses 18a—19a provided in the shell 18 and cap 19 to a relatively snug fitting slot 27.

The turning movements of the wheels 25 determines the positioning of each of the pairs of studs 22—22 and 23—23, respectively, to their operative or inoperative positions due to the frictional resistance of the wheels on their spindles 24, which effects a turning movement in the same direction of the ball 21 and the positioning of the studs 22—22 and 23—23. This action occurs at the start of movement of the trailer wheels in either direction the trailer is being moved. The studs 22—22 and 23—23 being arranged in pairs and at 90 degrees to each other, automatically position themselves for pivotal movements by reason of their guided action in the openings 18a—19a provided in the shell 18 and cap member 19.

When a pair of studs have been positioned for pivotal movements, as above described, the remaining pair of studs will be positioned in a relatively wide portion 28 of the shell 18 and cap 19, permitting said studs to freely move at right angles to their usual pivotal positions, as, for instance, a pair of diametrically opposed studs remain in pivotal relation with the shell and cap while the other pair of studs remains free to permit of a limited wobble action of the non-engaged studs to approximately 30 degrees on either side of center. This pivotal and free action of the studs permits the wheels to effect a rocking movement of the ball 21, which in turn aligns the wheels in the direction they are being turned to effect a canting or forward positioning of their pivotal axial centers to trail the vehicle wheels in one direction of their movement and to lead the vehicle wheels in the other direction of travel.

The studs 22—22 and 23—23 serve as a caster spindle for the independent pivotal action of the wheels, and this caster effect aligns the studs 22—22 for a forward inclination, radial dot and dash line C, which positions the wheel spindle 24 rearwardly of the vertical line B on the radial line D. This positioning of the wheel spindle 24 positions the same substantially on the vertical line E, which is also an appreciable distance rearwardly of the vertical line B (Fig. 7).

While the vehicle continues in the direction indicated by arrow (Fig. 7), the wheel spindle 24 remains as above pointed out, and the caster angle of the pivotal movements of the wheel remain on line C, which is due to the rotating movements of the wheels urging the wheel spindle 24 rearwardly and carrying therewith the studs 22—22 into the reduced openings 27—27, which limits their movements and provides the pivotal center therefor. As the wheel encounters various obstructions during its travel, it is free to pivotally adjust itself on the studs 22—22 while maintaining traction alignment of the wheels under the pulling effect of the vehicle.

Should the vehicle be turned about it at a rather sharp angle, the pull will be such as to cause the trailer to be swung therewith and effect a side drag on the wheels, which will cause them to pivot on their studs 22—22 (Fig. 1) to compensate for the effect of the drag, and which pivotal movement will align the wheels for traction in the direction the trailer is being bodily turned, and render the same easily controllable, in that, the trailer wheels and the steering wheels of the vehicle will effect a turntable action. As the vehicle is righted to be drawn on a substantially straight line, the caster effect of the trailer wheels will cause these wheels to right themselves and maintain alignment with the vehicle wheels.

With a trailer wheel construction as above stated, the wheels will be pivotally turned on their studs 22—22 and 23—23 in substantially the manner and approximately the same degree to which the steering wheels of the vehicle are manually turned, this turning effect occurring in either the forward or reverse direction of movement of the trailer, thereby permitting the driver to control the same at will and to pull or reverse the same into relatively small spaces and completely under the control of the driver at all times.

In the preferred embodiment, as clearly shown in Fig. 2, the wheel spindle 24 is illustrated as being below the axial center 16, for the reason of providing a greater swinging movement of the ball 21 effected by the traction resistance of the wheel 25 on a surface. With this arrangement of providing the wheel spindle below center, it will remain in the position as shown in Fig. 7 under all road conditions while the vehicle is being pulled in one direction, and will have a leverage effect to turn the ball 21 in the reverse direction when the wheels are turned in the reverse direction.

In Fig. 6, in which a modified form is illustrated, the wheel spindle 24a is axially aligned with the axis center 16a on which the ball 21a is secured and the wheel spindle 24a is secured to the shell 29 which carries the studs 22a—22a and 23a—23a that extend into recesses 18b—18b provided in the ball 21a. The frictional effect of the rotating movements of the wheel 25a will pivotally turn the shell 29 in the manner described for the ball in the preferred form, but the wheel spindle 24a will remain on the axial center of the axle 16a while the studs 22a—22a are rotated into and out of operative positions in their respective recesses 18b—18b. This effect of the positioning of the studs 22a—22a is clearly illustrated in the diagrammatic view, Fig. 8, in which the studs are normally retained on the dot and dash radial line C' to provide a caster for the wheel 25a and the wheel spindle remains on the axial center line B' at all times while the studs are moved in reverse direction to the dot and dash line D'.

When it is desired to operate the trailer in the manner of those in common use, a pin 30 (dotted lines Fig. 2) is extended through an opening 31 in the shell 18 and into an opening 32 in the ball 21. This pin 30 serves to rigidly lock the ball 21 in the socket 20 and will retain the ball in rigid position with respect to the axle 16.

I claim:

1. In a trailer wheel supporting structure, an axle, wheel spindles pivoted at each end of said axle, wheels on said spindles, means limiting the pivotal movement of said spindles, said means permitting of a wobble movement of said spindles between their limits of pivotal movement.

2. In a trailer wheel supporting means, an axle, ball and socket supported spindles at each end of said axle, a wheel journaled on said spindles, and means for guiding and limiting the movements of said ball and socket supported spindles in either direction of turning movement of the wheels.

3. In a trailer wheel construction of the character described, comprising, an axle, ball and socket spindle means on each end of said axle, a wheel journaled on said spindle, and means on said ball and socket means for guiding and limiting the movement of the ball in said socket means in either direction of movement of said ball.

4. A trailer wheel support comprising in combination, an axle, socket means on the ends of said axle, a ball cooperating with each of said sockets for rocking and turning movements therein, guide means provided in said sockets, diametrically opposed pins arranged in pairs extending within said guide means and alternately engageable in pairs therewith for limiting the rocking and turning movement of said ball within its socket, and a wheel spindle extending outwardly from said ball.

5. In a trailer wheel support, an axle, wheel spindles wobbily attached to the ends of said axle, wheels on said spindles, means limiting the wobble movements of said spindles and forming pivotal centers therefor, said means being arranged to provide inclined pivotal centers forming a caster pivot for the wheels in either direction of their turning movements.

6. In a trailer wheel support, an axle, wheel spindles wobbily retained on the ends of the axle, wheels on said spindles, means limiting the wobble movements of said spindles and forming pivotal centers on which the spindles may independently pivot, said means being automatically controlled by the direction of turning movements of the wheels.

7. In a trailer wheel support, an axle, wheel spindles wobbily carried on the ends of the axle, wheels on said spindles, studs diametrically opposed and arranged in pairs on said spindles and engageable with the axle, said pairs of studs being arranged at 90° with one pair engageable for pivotal movements of the spindle and the other pair of studs serving to limit the pivotal movements of the spindle.

8. In a trailer wheel support, an axle, wheel spindles carried for wobbly movements at each end of the axle, wheels on said spindles, means limiting the wobble movements of the spindles and forming pivotal centers on which the spindles may independently pivot in accordance with the turning movements of the wheels.

9. In a trailer wheel support, an axle, wheel spindles carried for a wobbly movement on the ends of the axle, wheels on said spindles, means between the axle and spindles limiting the wobble movements of the spindles and comprising diametrically opposed studs arranged in pairs, guide means carried by the axle and receiving said studs, said guide means being arranged to freely receive and form pivotal centers for each of said pairs of studs at opposite directions of their bodily movements in said guide means, one of said pairs of studs serving to limit the bodily movements of said spindles while the other pair of studs is pivotally engaged with said guide means.

FLOYD E. MINER.